US006205671B1

(12) United States Patent
Langmaid

(10) Patent No.: US 6,205,671 B1
(45) Date of Patent: Mar. 27, 2001

(54) ELECTRONIC INCREMENT MARKER

(76) Inventor: Jonathan C. Langmaid, 70 Cleaves St., Yarmouth, ME (US) 04096

( * ) Notice: Subject to any disclaimer, the term of this patent is extended or adjusted under 35 U.S.C. 154(b) by 0 days.

(21) Appl. No.: 09/136,898

(22) Filed: Aug. 19, 1998

(51) Int. Cl.[7] ................................ G01B 3/02; G09G 3/18
(52) U.S. Cl. ................................ 33/663; 33/494; 33/70; 345/50; 362/23; 702/161
(58) Field of Search ................................ 33/663, 483, 491, 33/492, 494, 679.1, 665, 700; 702/161, 158, 155; 345/50; 362/23; 377/24

(56) References Cited

U.S. PATENT DOCUMENTS

| 4,158,229 | 6/1979 | Woo, Jr. et al. | 33/700 |
| 4,839,833 | 6/1989 | Parhiskari | 33/491 |
| 4,941,267 | 7/1990 | Miller, Jr. | 33/700 |
| 5,050,312 | 9/1991 | McCannon | 33/700 |

*Primary Examiner*—Christopher W. Fulton
(74) *Attorney, Agent, or Firm*—Williams & Associates; Frederick C. Williams

(57) ABSTRACT

A tool for selectively marking a surface in specific desired increments for use in a variety of mechanical arts. The tool has a ruled face and indicates selected increments by illuminating light emitting devices corresponding to the locations to be marked.

10 Claims, 5 Drawing Sheets

ELECTRONIC INCREMENT MARKER

FIELD OF THE INVENTION

This invention relates to layout tools, and more particularly tools used for making a plurality of evenly spaced marks in connection with engineering, carpentry, woodworking, drafting, or other mechanical arts. The current invention utilizes embedded software to calculate and visually display markings at evenly-spaced increments, which markings can then be transferred by the user to the work surface.

BACKGROUND OF THE INVENTION

In carpentry, drafting, and other mechanical arts, the need often arises to mark a surface at regular intervals. For example, in placing siding, setting tile, or installing framing members, the need to calculate and mark precise locations at specific intervals repeatedly arises. The conventional approach to marking involves employing a conventional ruler or tape measure with the user performing mental calculations to determine where each mark should be placed. This method is time consuming and frequently leads to error. In turn, marking error can lead to drafting error, calculating error, or error in construction. For instance, in many engineering disciplines including civil and mechanical engineering and architecture, the spacing of structural elements such as frames, beams, or columns is linked to the calculation of stiffness or weight carrying capability of the structure. If, in drawing the structure to be built or in laying out framing at the site, errors occur in positioning the structural members, serious consequences for structural adequacy to withstand the applied forces may result. The ability to calculate and mark standard intervals quickly and with confidence thus provides an important advantage to the engineer, draftsman, or worker assembling the structure. Despite the drawbacks, marking of increments is typically accomplished with nothing more sophisticated than a ruler or tape measure.

Mechanical markers and dividers are well known in the art. So called "lazy-tong" or scissor-joint dividers such as the device disclosed in patent Ser. No. 381,560, operate by dividing a specific length-wise measurement into a selected number of equally spaced intervals. These devices allow the user to select the total length and the number of sections into which it will be divided. When the user mechanically opens or closes a plurality of interlocking folding dividers, the device indicates where the marks are to be placed. Alternatively, devices such as these may be used to indicate a plurality of equal intervals, each having a particular dimension. Indeed, some devices, including those disclosed by patent Ser. No. 425,168, patent Ser. No. 736,168, patent Ser. No. 877,795, U.S. Pat. No. 1,643,968, U.S. Pat. No. 3,157,953, and U.S. Pat. No. 3,250,014 include a ruled plate to assist the user in determining the measurement of the interval being marked.

There are many disadvantages of the lazy-tong or scissor-joint types of devices. These tools are usually awkward and heavy. They also require the device to be manipulated physically to achieve the desired interval. Moreover, when these devices are constructed of metallic parts, they can mark or mar delicate surfaces such as paper, plastic, or fine wood, if great care is not exercised while using them.

Where use of these devices involves physical manipulation of a plurality of hinges, a great deal of force may be required. The tool may become rusted, corroded, or bent such that accurate positioning by the user becomes impeded, physically difficult, or time consuming. Furthermore, to the extent that the device is large, heavy or awkward, it becomes difficult for the user to hold the device in a particular orientation while transferring incremental marks to the surface being marked. A related problem with some lazy-tong or scissor-joint dividers is that the device may slide out of position while the marks are in the process of being transferred. If detected, correction of the error requires the user to recalibrate and re-mark the increments. Alternatively, if undetected, sliding occurring during the marking process may result in the transfer of erroneous markings, with subsequent errors in construction.

Other tools such as the device disclosed in U.S. Pat. No. 4,212,108, which do not rely on a lazy-tong or scissor-joint type of design, tend to be relatively inflexible in allowing selection of intervals. Some tools are limited to a single application, such as determining the spacing of studs used to frame a wall or applying siding, and are not easily adapted to other uses.

One further drawback of all the aforementioned devices is that they are not ideal for use in low light conditions. When the task of marking is, for example, being performed inside a house under construction or outside on an overcast day or near dawn or twilight, an illuminated device would add to the user's confidence in placing marks in the correct locations.

Accordingly, an object of this invention is to make an incremental measuring device which is both accurate and reliable and also easy to handle and use. Another object of this invention is to produce a tool that is useful in a variety of applications and disciplines. Another object of this invention is to provide a durable, lightweight tool. Another object of this invention is to provide a tool that is rugged enough for heavy use, but compatible for use in delicate tasks such as drafting. Still another object of this invention is to provide a device that does not have a large number of moving parts that may become frozen, rusted, or otherwise difficult to manipulate or that may shift inadvertently during the marking operation. Yet another object of this invention is to provide a device with illuminated indicators that may be seen easily in low or uncertain lighting conditions.

SUMMARY OF THE INVENTION

The present invention provides a means of easily and definitively displaying marks in desired evenly-spaced increments. These marks may be transferred by the user to the surface being marked. The user provides the total length to be marked and the approximate interval distance between marks that the user desires. The device calculates the number of intervals and the spacing and uses these calculations to light a display that tells the user where to place his marks.

For example, a user installing siding on a house would enter the measured height of the surface to be covered by siding, which measurement corresponds to total length. The user next enters the approximate exposure, defined as the distance from the butt of one piece of siding to the butt of the piece of siding above it, that is, the amount of the siding surface that is exposed to view after installation. The approximate exposure measurement corresponds to the desired incremental distance. The tool will calculate the number of rows of boards needed and light up on the display positions corresponding to the appropriate placement locations. The user then transfers the marks to the side of the house.

The present invention does not rely on moving parts to establish the increment. This reduces the possibility of breakage. In addition, the device will not "lose" the precise increment to be marked while the user is marking. The marker indicators will not shift position during the marking operation, and are easily reset after the surface has been marked. Furthermore, the device will not become inoperable because it has stiffened or seized.

The locations to be marked are clearly visible to the user even in low light conditions. This allows the user to mark increments quickly and confidently. The applicable marker indicators are illuminated throughout the marking operation.

DESCRIPTION OF THE PREFERRED EMBODIMENT

Figure 1:
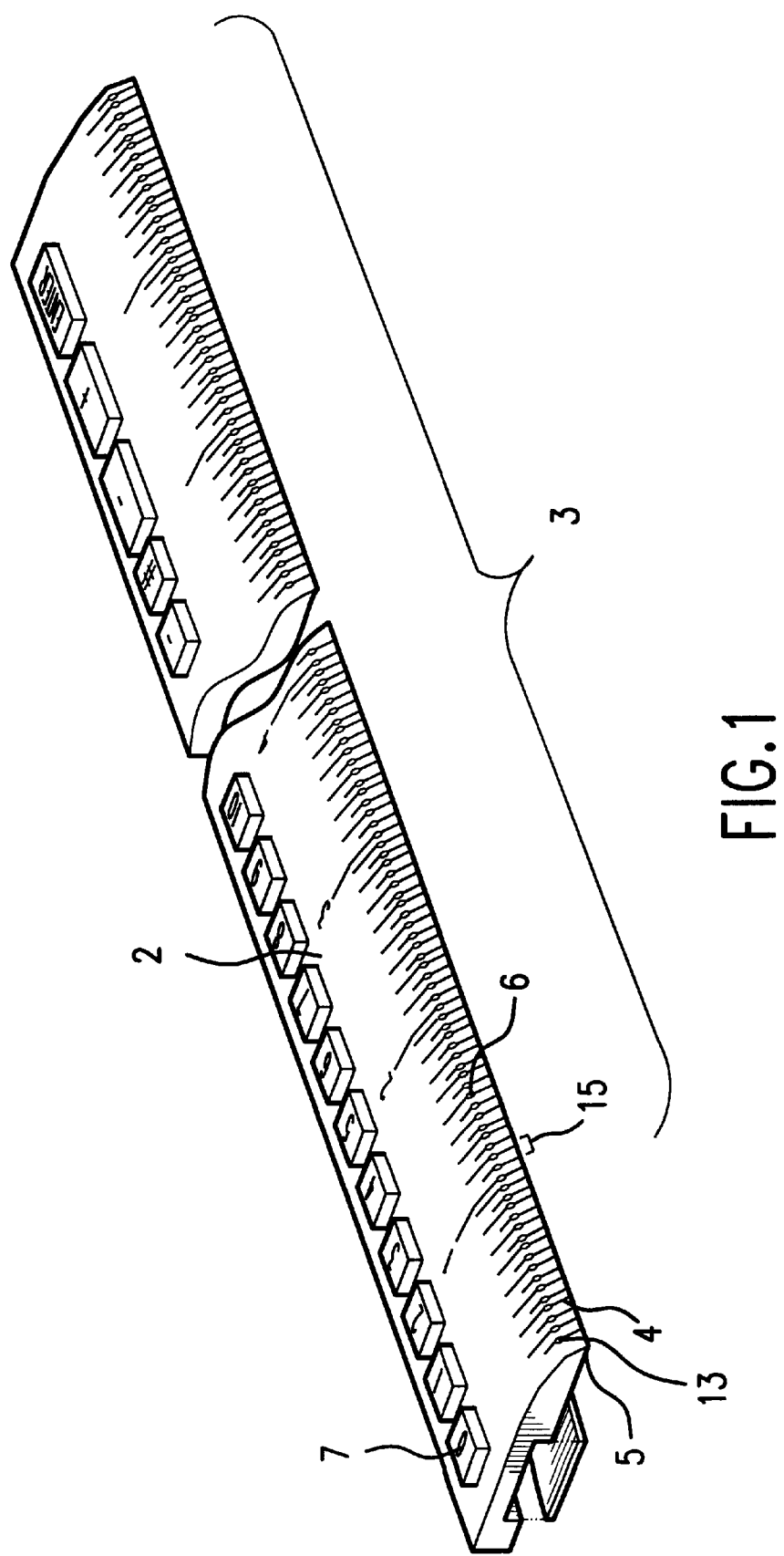
FIG. 1 sets forth an expanded isometric view of the electronic increment marker.

As shown in FIG. 1, the electronic increment marker device 1 consists of a body 2 that is of a length 3, chosen to suit the particular application. For instance, where the tool will be used on a drawing board or in an office setting the length 3 would likely be that of a standard ruler. If the tool is to be used in construction or other field applications, the length 3 might be that of a conventional measuring device (18", 24", 36"or one meter, for example, depending on the application), or it might be substantially longer for large layout applications. In a preferred embodiment, the body 2 has a plurality of hatch marks 4 along its leading edge 5, having an equal distance 15 between any two adjacent hatch marks. The number of hatch marks may be made as large as desired so that the spacing 15 between hatch marks may be as small as desired, limited only by the visual ability to distinguish two separate hatch marks. Otherwise stated, hatch marks 4 are spaced evenly along length 3 of leading edge 5 and, in a preferred embodiment correspond to standard units of measure under either the British or metric system. Alternatively, hatch marks 4 may correspond to different units of measure on the sides of a standard three-sided architectural or engineering scaling ruler.

Figure 2:
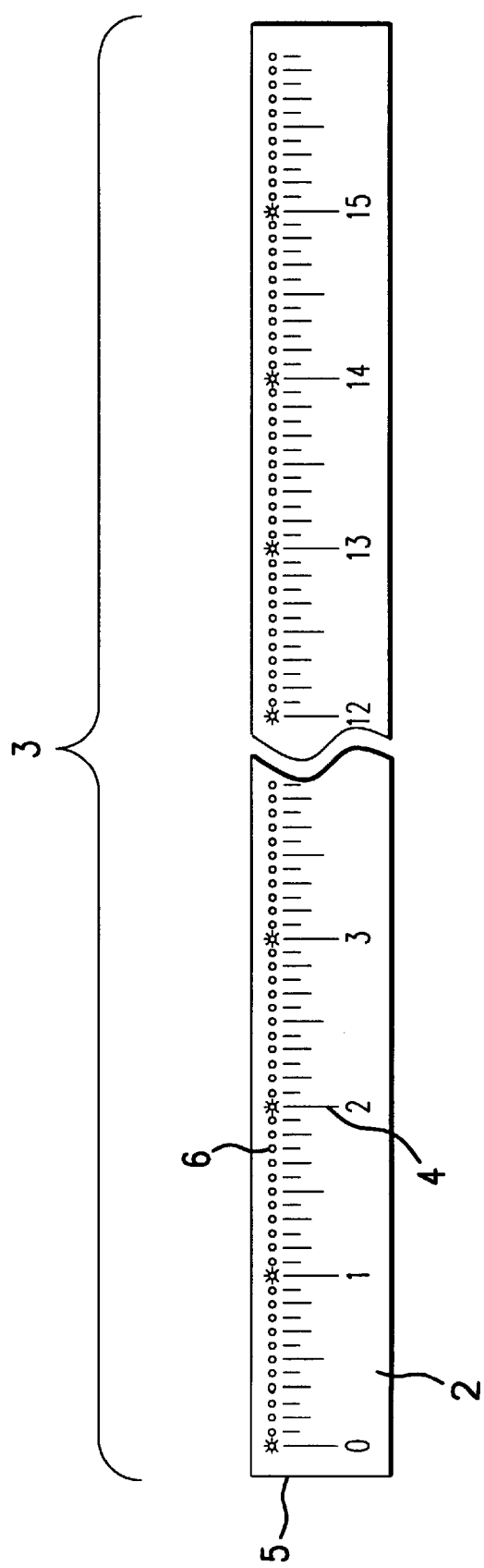
FIG. 2 is a detail showing the ruled display, illuminated to indicate one inch increments.

As shown in FIGS. 1 and 2, a plurality of small light emitting diodes 6, each of the plurality of light emitting diodes corresponding to one of the plurality of hatch marks 4, are embedded in body 2 adjacent to leading edge 5. The light emitting diodes 6 are also spaced at regular intervals along length 3 of leading edge 5. The light emitting diodes 6 may be co-linear, or in an alternate embodiment, may be staggered in displaced rows in a repetitive pattern along length 3 so as to be distinguishable.

Illumination of one or more light emitting diodes 6, illustrated in FIG. 2, results from user entry of required information into the electronic increment marker system. Data entry means 7 and embedded calculating software, shown in FIGS. 3 through 5, may be incorporated into body 2, as shown in FIG. 1. Alternatively, data entry means 7 and calculating software shown in FIGS. 3 through 8 may exist as a separate unit resembling a standard calculator and connected to light emitting diodes 6 in body 2 via standard electrical connections. Data entry means 7 may be any of the conventional key pads or other data entry devices well known in the electronic arts.

Figure 3:
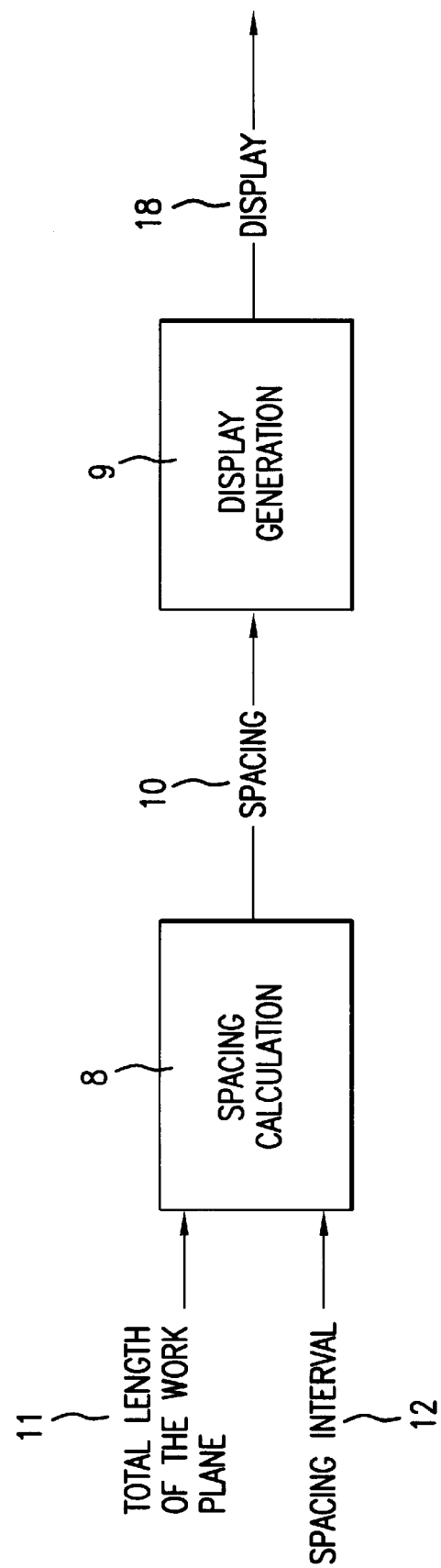
FIG. 3 is a functional block diagram of the electronic functioning of the present invention.

As shown in FIG. 3, the operation of the tool comprises two principal functions: spacing calculation function 8 and display generation function 9. Spacing calculation function 8 calculates the optimal spacing by accepting input parameters from the data entry means 7 representing total length of the work plane 11 and desired approximate spacing interval 12. In a preferred embodiment, spacing calculation function 8 calculates the number of intervals to be spaced evenly along the length of the work plane by rounding to the nearest whole number the result obtained by dividing total length of the work plane 11 by approximate interval 12. The result of this calculation yields the number of intervals to be spread by the tool along the length of work plane 12. The tool next calculates the exact length of each interval by dividing total length of the work plane 11 by the number of intervals obtained in the previous calculation. The exact length of each interval is then rounded to correspond with the resolution of the tool, as represented by the distance 15 between hatch marks. For example, if the spacing between hatch marks 15 and between light emitting diodes 6 is 1/16 of an inch, then the length of intervals would be rounded to the nearest 1/16 inch. The result of this rounding calculation, spacing 10, is the output of spacing calculation function 8 used as input to display generation function 9.

Note that spacing calculation function 8 may be accomplished according to many different methods well known in the art. In a preferred embodiment, spacing calculation function 8 is accomplished utilizing simple logic functions accompanied by an arithmetic logic unit as described in the preceding paragraph. However, other methods are possible including, without limitation, simple microprocessors and manual entry of spacing using an external calculator.

Figure 4:
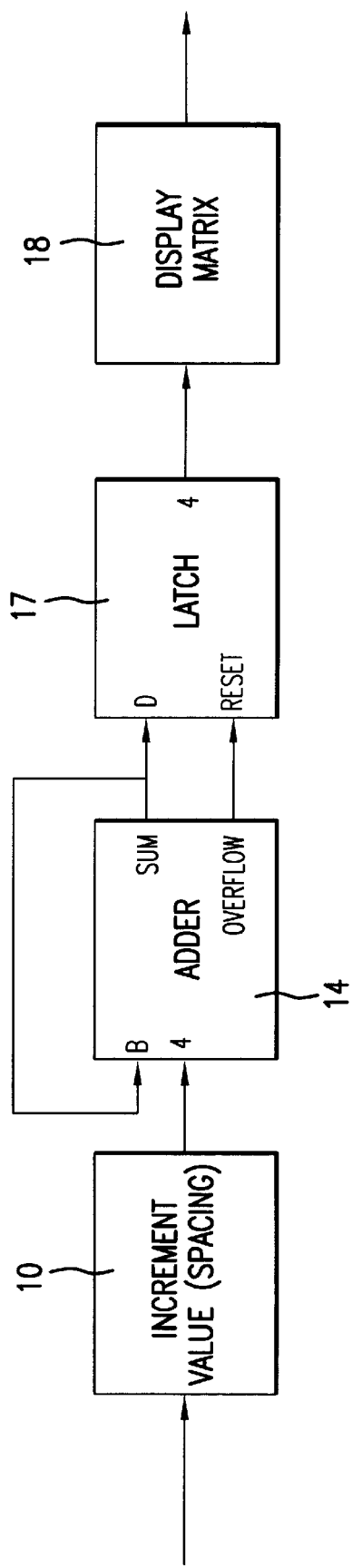
FIG. 4 is a functional block diagram showing the logic used to activate the display matrix.

FIG. 4 diagrams the working of display generation function 9. Display generation function 9 is initialized by lighting diode zero 13, shown on FIG. 1, corresponding to a measurement of zero. The selection of light emitting diodes to light is determined with reference to increment value 16, which is defined as spacing 10 times the distance between two adjacent hatch marks 15. Adder 14 adds increment value 16 to the zero measurement to identify the second diode to be lit. When adder 14 determines which diode to light, it signals latch 17 that triggers display matrix 18 to switch the appropriate diode to the on position, thereby lighting it. Adder 14 then takes the sum it has previously calculated and again adds increment value 16 to yield the third diode to be lit and signals latch 17 to light the corresponding diode, and so on. Otherwise stated, the sequence of light emitting diodes to illuminate is determined by adding increment value 16 in an adder continuously until the number of light emitting diodes on the tool is exceeded. In a preferred embodiment, display generation function 9 causes the circuitry to light the appropriate light emitting diodes fast enough so that they appear to the eye to be lit immediately. Accordingly, in a preferred embodiment, the clock speed would be set so that it exceeds the total number of light emitting diodes on the tool times a frequency of the order of 20 Hz which the human eye perceives as continuous.

Figure 5:
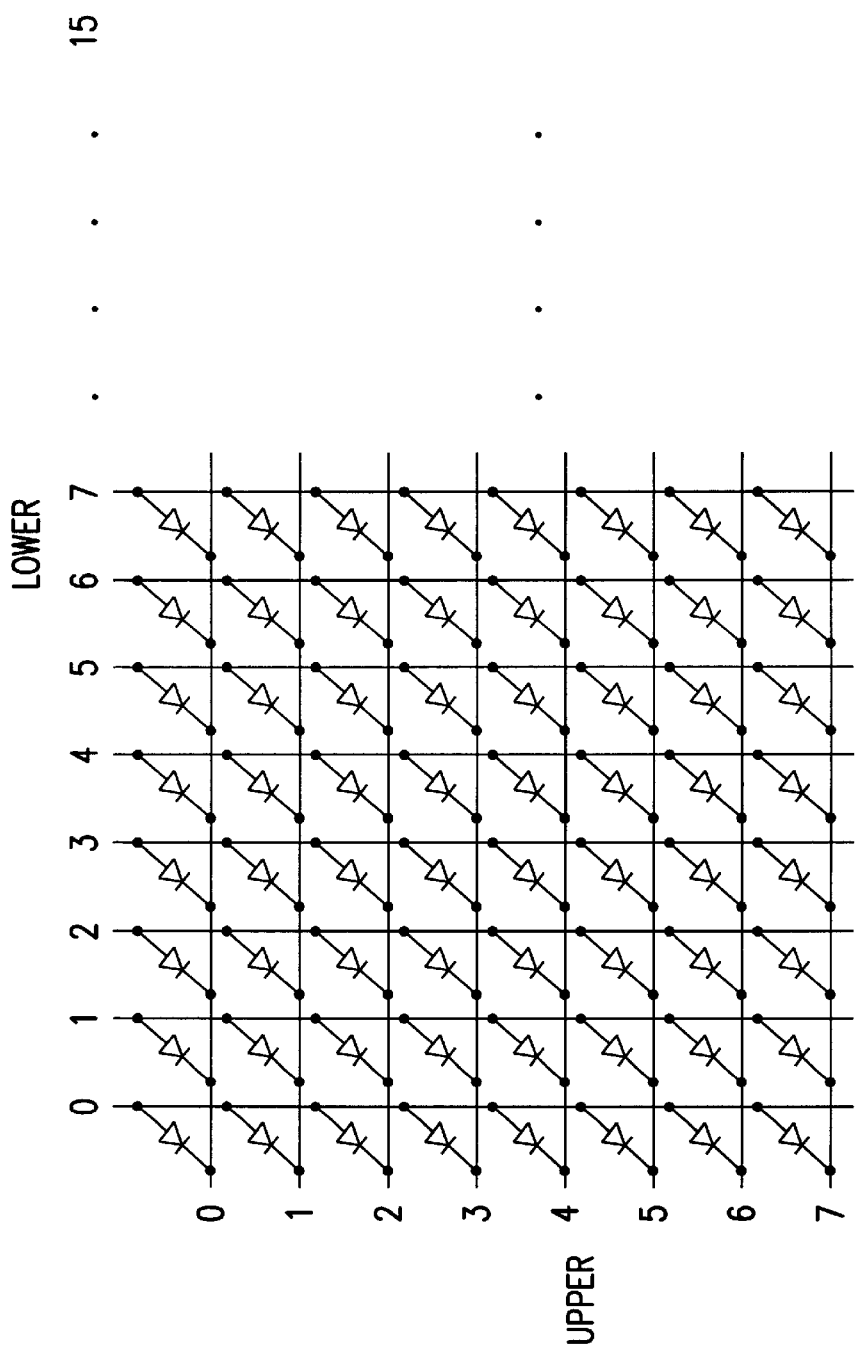
FIG. 5 details display matrix configuration.

FIG. 5 shows detail of display matrix 18 to illustrate how matrix methodology may be used to activate the appropriate light emitting diodes. In this example, 256 light emitting diodes are arranged in a 16×16 array. The light emitting diodes are lighted according to the value sent to display matrix. A 32-bit value is sent and separated into two 16-bit words, an Upper Word and a Lower Word. Each word is decoded from a Hex value to a binary value using a 4:16 line decoder. The Upper Word is routed to the n side of the light emitting diodes, as shown in FIG. 5, and the Lower Word is inverted and then tied to the p side of the light emitting diodes. The vertical traces for the Lower Word are normally LOW and the horizontal traces for the Upper Word are normally HIGH. For any given value sent to display matrix 18, one Upper Word trace will be active and one Lower Word trace will be active. Each active trace will have an inverted level (then the normal level) and light only one diode (the diode corresponding to the value sent to display matrix 18).

I claim:

1. An apparatus for laying out evenly-spaced increments generated from user supplied data, said apparatus comprising:
   a. a body containing a plurality of evenly spaced hatch marks such that the spacing between two adjacent hatch marks is uniform;
   b. a plurality of light emitting devices linearly arranged in at least one row such that each of the plurality of light emitting devices corresponds exactly to one and only one of the plurality of hatch marks;
   c. means for entering data representing a total length and an approximate spacing interval;
   d. a processor which produces a calculated spacing interval from said data and utilizes said calculated spacing interval to identify a set of light emitting devices to be illuminated which are spaced evenly apart by the calculated spacing interval;
   e. an electric circuit which generates electrical signals which selectively illuminate said set of evenly spaced apart light emitting devices corresponding to said calculated spacing interval.

2. The apparatus of claim 1 in which the apparatus comprises a ruler having a plurality of light emitting devices embedded in a ruled surface.

3. The apparatus of claim 1 in which the unit for processing information is contained in the same body as the light emitting devices.

4. The apparatus of claim 1 in which the means for receiving data is contained in the same body as the light emitting devices.

5. The apparatus of claim 1 in which the means for receiving data is a keypad.

6. The apparatus of claim 1 in which the light emitting device is a light emitting diode.

7. An apparatus for laying out evenly-spaced increments generated from user supplied data, said apparatus comprising:
   a. a first body containing a plurality of evenly spaced hatch marks such that the spacing between two adjacent hatch marks is uniform;
   b. a plurality of light emitting devices linearly arranged in at least one row on said first body such that each of the plurality of light emitting devices corresponds exactly to one and only one of the plurality of hatch marks;
   a second body containing;
      i. means for entering data representing a total length and an approximate spacing interval;
      ii. a processor which produces a calculated spacing interval from said data and utilizes said calculated spacing interval to identify a set of light emitting devices to be illuminated which are spaced evenly apart by the calculated spacing interval;
      iii. an electric circuit which generates electrical signals which selectively illuminate said set of evenly spaced apart light emitting devices corresponding to said calculated spacing interval.
      iv. electrical connection between the first body and the second body.

8. The apparatus of claim 7 in which the first body comprises a ruler having a plurality of light emitting devices embedded in a ruled surface.

9. The apparatus of claim 7 in which the means for receiving data is a keypad.

10. The apparatus of claim 7 in which the light emitting device is a light emitting diode.

* * * * *